United States Patent
Meya

[11] Patent Number: 6,062,374
[45] Date of Patent: May 16, 2000

[54] LINK CHAIN FOR CHAIN CONVEYORS

[76] Inventor: Hans Meya, Thünen 34, 59368 Werne, Germany

[21] Appl. No.: 08/989,104

[22] Filed: Dec. 11, 1997

[30] Foreign Application Priority Data

Dec. 13, 1996 [DE] Germany .......................... 196 51 873
Jan. 17, 1997 [DE] Germany .......................... 197 01 579

[51] Int. Cl.⁷ .................................................. B65G 19/24
[52] U.S. Cl. .......................................... 198/731; 198/733
[58] Field of Search .................................... 198/731, 733, 198/712, 834

[56] References Cited

U.S. PATENT DOCUMENTS

| | | | |
|---|---|---|---|
| 4,585,117 | 4/1986 | Hahn ........................................ | 198/731 |
| 4,867,300 | 9/1989 | Braun et al. ............................ | 198/731 |
| 5,069,328 | 12/1991 | Schupphaus et al. .................. | 198/731 |
| 5,213,199 | 5/1993 | Braun et al. ............................ | 198/731 |
| 5,435,434 | 7/1995 | Tekathen et al. ....................... | 198/731 |

FOREIGN PATENT DOCUMENTS

| | | |
|---|---|---|
| 2247300B2 | of 0000 | Germany . |
| 3219178C2 | of 0000 | Germany . |
| 3234137C3 | of 0000 | Germany . |
| 3235474C2 | of 0000 | Germany . |
| 3615734C2 | of 0000 | Germany . |

Primary Examiner—Christopher P. Ellis
Assistant Examiner—Gene O. Crawford
Attorney, Agent, or Firm—Bauer and Schaffer, LLP

[57] ABSTRACT

The link chain according to the invention is preferably intended for scraper-chain conveyors of long conveyor lengths and correspondingly high drive powers, and comprises vertical and horizontal chain links that are hooked into one another in an articulated manner. The vertical chain links have a non-round, approximately semicircular cross-section provided on the external contour with a flattening, and the horizontal chain links have an oval internal opening whose clear internal width, has a shape corresponding to the cross-sectional contour of the vertical chain links, and is greater than the clear internal width of the vertical chain links. It is preferable that the pitch and the length of the horizontal chain links is greater than the pitch and length of the vertical chain links. The external boundary of the nose parts of the horizontal chain links preferably extend at right angles to the chain axis, with the result that a broad chainwheel bearing surface is formed. In the case of a single-strand or two-strand scraper-chain assembly, the horizontal chain links serving for the scraper connection may be designed in the manner of webbed chain links having a central web which has a push-in opening which serves for the coupling connection of the scrapers with the aid of coupling pins arranged on the latter.

29 Claims, 4 Drawing Sheets

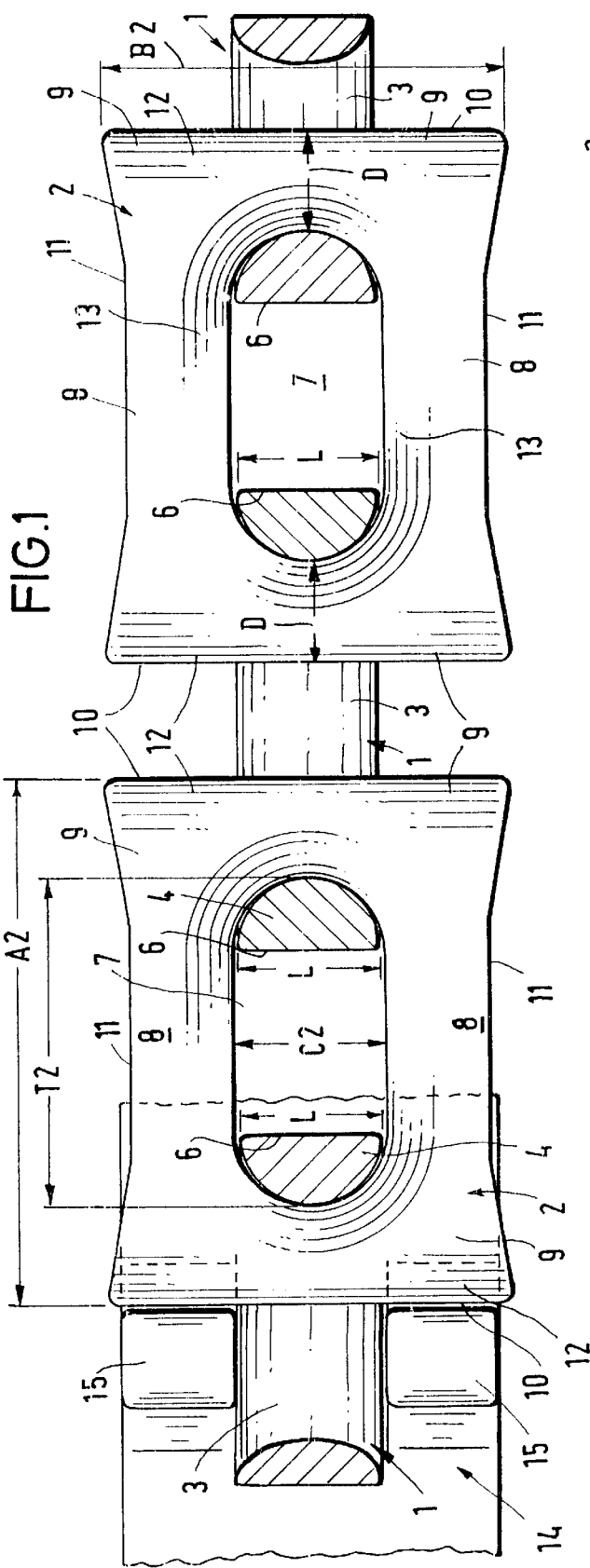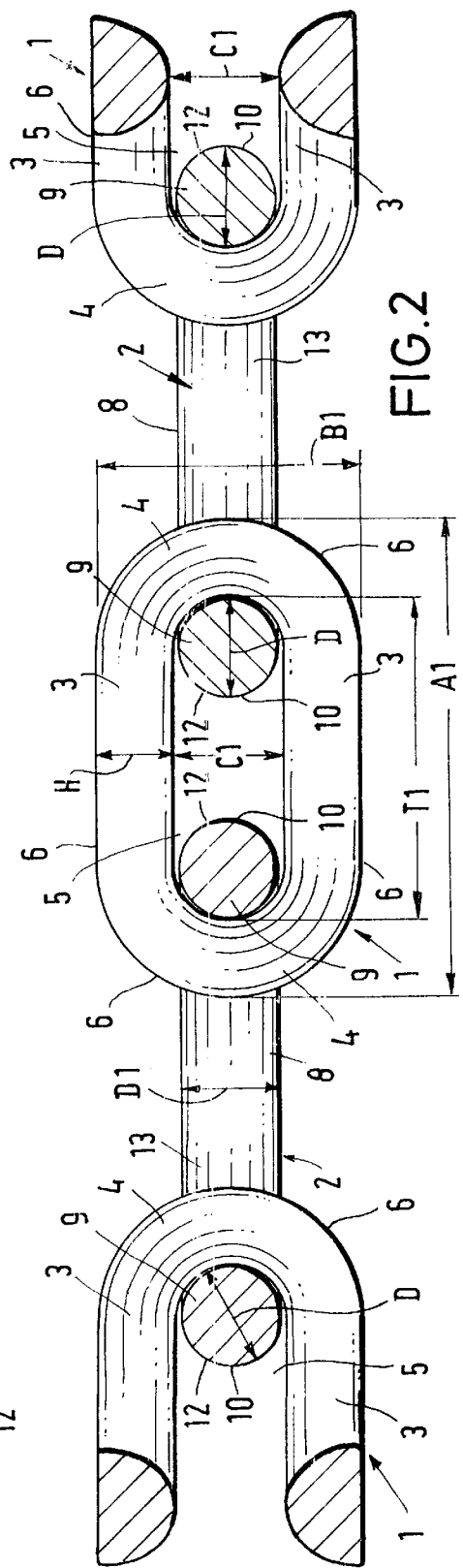

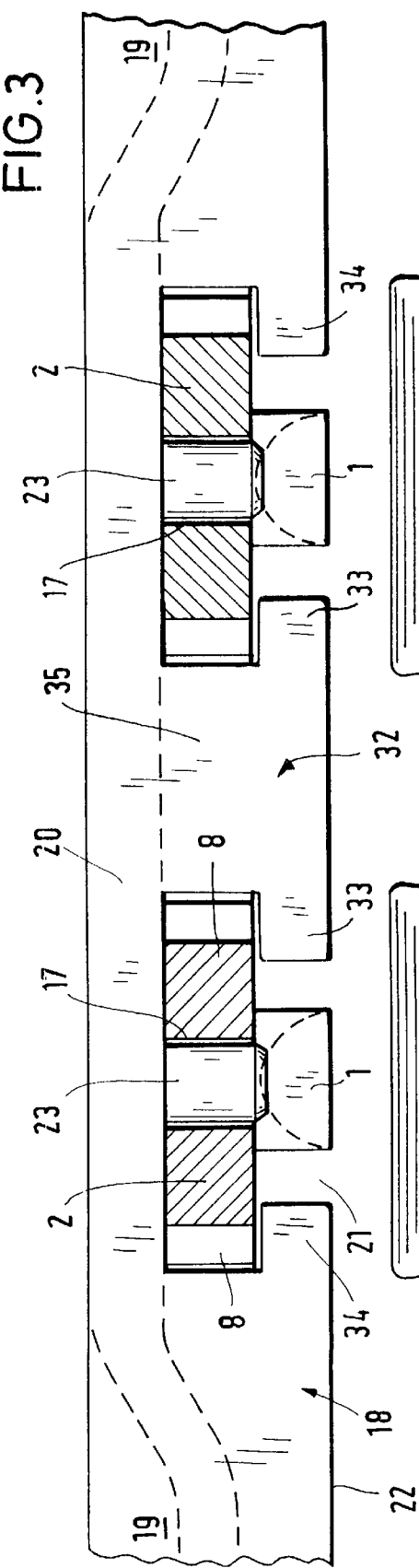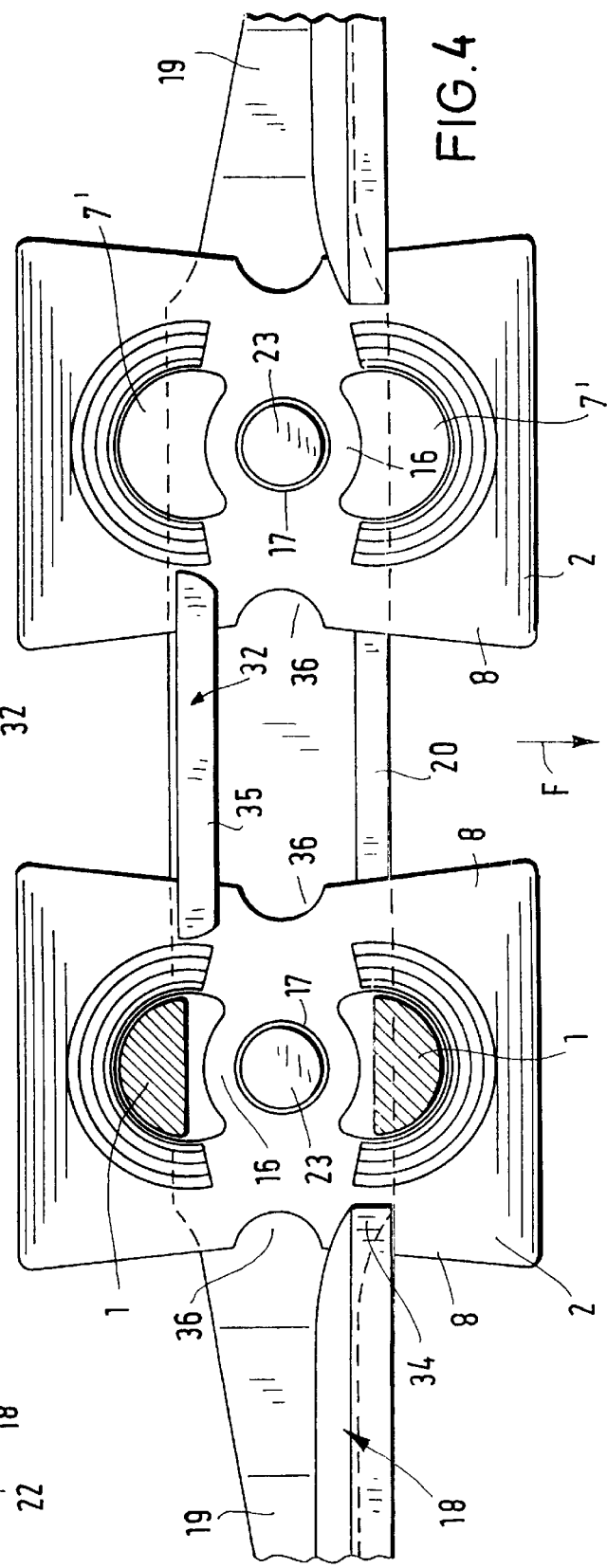

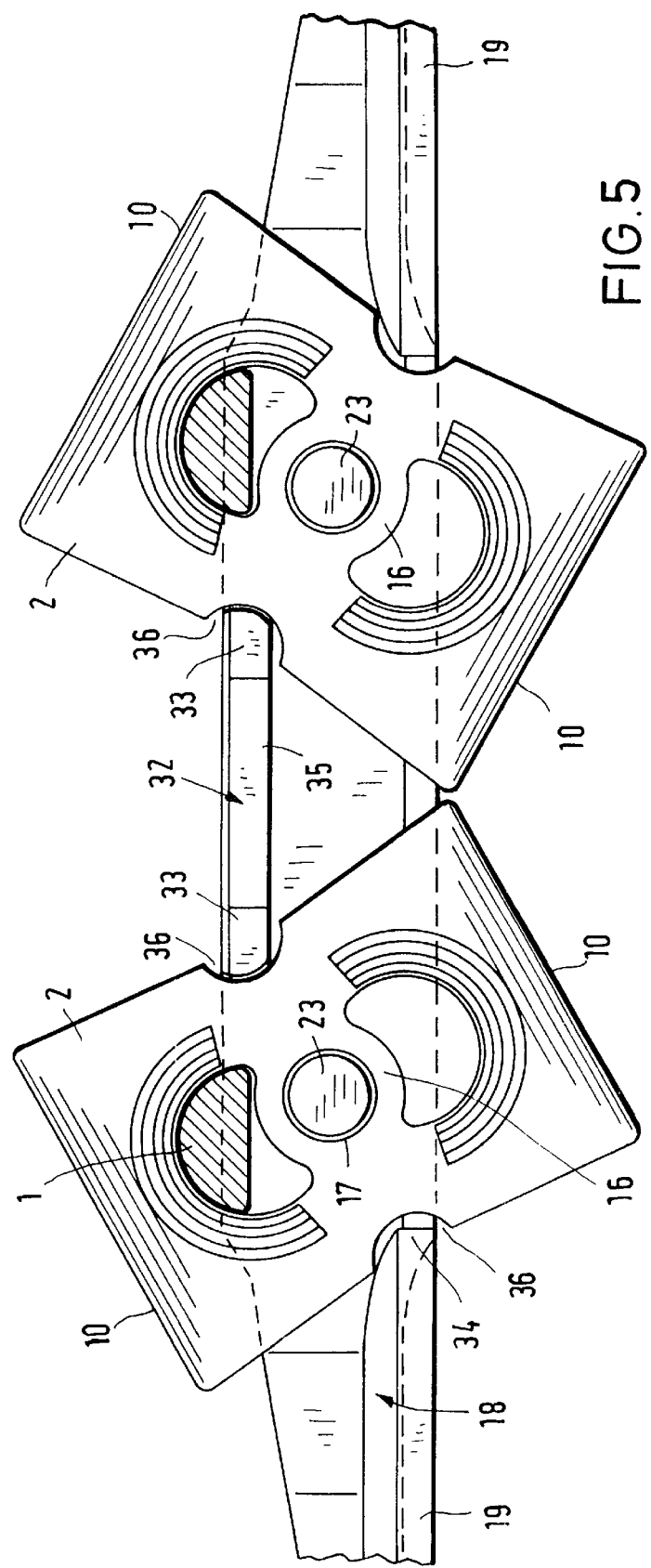

LINK CHAIN FOR CHAIN CONVEYORS

FIELD OF THE INVENTION

The invention relates to a link chain for chain conveyors, in particular, although not necessarily exclusively, scraper-chain conveyors for use in mining, comprising vertical and horizontal chain links that are hooked into one another in an articulated manner.

In its preferred application, the invention is directed towards a single-strand or two-strand scraper chain assembly for scraper-chain conveyors designed as a central or double central chain scraper conveyors, as are employed primarily in underground mining operations and here, preferably, in face operations.

BACKGROUND OF THE INVENTION

Whereas in the past link chains in standard sizes, produced from round wire, were used for the scraper chains of scraper-chain conveyors, in the case of mining conveyors a change was already made a long time ago to use link chains with a special shaping of the chain links for the scraper chains, in order to meet the continually increasing requirements on the chain forces and to correspond to the operating behaviour of the scraper chains. In the case of the present scraper-chain conveyors, in order to be able to use stronger chains, which would meet the increased power demand on the scraper-chain conveyors, it has been proposed in the prior art to flatten the vertical chain links of the chains on their parallel longitudinal limbs and accordingly, without reducing the cross-section, to reduce them in their overall height to a dimension which corresponds to a standardized round-link chain of lower chain strength (DE 32 34 137 C3, DE 36 15 734 C2).

Furthermore, considerable efforts have been directed to improving the running and loading behaviour of the scraper chains, which are highly loaded in use, in particular in relation to their expansion behaviour and to their interaction with the driving chainwheels. Thus, for example, it is known to use, for the horizontal chain links of the highly-stressed link chains, special links which are reinforced and broadened at their chain-link nose parts, so that the specific pressure per unit area when the chains are running around the chainwheels is reduced, and hence also the wear on the interacting surfaces of the horizontal chain links and the chainwheel toothing is reduced (DE 22 47 300 B2, DE 32 19 178 C2, DE 32 35 474 C2). In the case of these chains, the usual round wire chain links in the welded design are used for the vertical chain links.

SUMMARY OF THE INVENTION

Proceeding from the abovementioned development of the chains the invention is primarily based on the object of providing a high-strength link chain for use in chain conveyors, such as primarily scraper-chain conveyors for use in mining, which can be used successfully even given very great lengths and correspondingly high power demand on these conveyors, for example in the case of face conveyors having lengths around or above 400 m, without needing to be excessively strongly dimensioned in terms of their overall height and in their weight. The link chain also preferably has good loading and running behaviour and, when used as scraper chains, being intended to offer the preconditions for reliable scraper connection. In a preferred form, the invention is directed to a single-strand or two-strand scraper-chain assembly for scraper-chain conveyors, preferably constructed as central or double central chain scraper conveyors, with a reliable scraper connection to the chain links of the scraper-chain assembly.

In the link chain or scraper chain according to the invention, the eye-like vertical chain links have a cross-section that is flattened on its external contour so that, even given a very high required chain strength, the overall height of the chain can be kept within limits, and the scraper chain can also be used in scraper-chain conveyors used in mining, preferably in standardly dimensioned conveyor channels. Since the vertical chain links have all around their circumference the same flattened profiling with an at least approximately semicircular cross-section, they can be produced relatively simply and inexpensively from rolled profiled wires in the usual welded design. In this case, rolled profile wires having very strong cross-sections for the high power demand of the conveyor can be used In one form ot the link chain according to the invention the clear internal width of the internal openings of the horizontal chain links is distinctly greater than that of the vertical chain links, so that the latter can be hooked without difficulty into the internal openings of the horizontal chain links, even in the case of appropriately strongly dimensioned cross-sections. With the large width of the nose parts of the horizontal chain links, which is preferably considerably greater than the external width of the vertical chain links, the circulating behaviour of the link chain on the driven chainwheel can be improved, and the pressures per unit area between the transversely-running nose surfaces of the horizontal chain links and the chainwheel can be considerably reduced. In addition, the horizontal chain links preferably have, at their nose parts in the chain link longitudinal central axis, a round cross-section with a diameter which is smaller than the external width of the flattenings of the vertical chain links and also the clear internal width of the internal opening of these chain links. This also results in the possibility, given the required large cross-sectional strength, of dimensioning the approximately semicircularly profiled vertical chain links to be relatively broad but low. Overall, using the invention, a link chain may. be provided which is of relatively low construction, gives a high chain force, can be produced without excessive effort and has a beneficial circulation behaviour at the chain drum.

In the case of the preferred application of the link chain according to the invention in scraper-chain conveyors, in particular central or double central chain scraper conveyors, the special configuration of the horizontal chain links, which are powerful and dimensioned to be large in relation to the vertical chain links, provides the possibility of using these chain links for the scraper connection and configuring them appropriately. In this case, the scrapers can be an integral component of the horizontal chain links or else, preferably, can be connected detachably and exchangeably to the horizontal chain links. What is primarily advantageous here is an arrangement in which at least the horizontal chain links, serving for the scraper connection, of the scraper-chain assembly are constructed in the manner of webbed chain links and, on the fixed central webs reaching transversely through their internal opening, have push-in openings for coupling pins that are fixedly arranged on the scrapers and are directed towards the scraper foot. With the aid of these coupling pins, it is possible to achieve a reliable scraper connection to the horizontal chain links of the scraper-chain assembly, it also being possible to achieve simplifications when connecting and exchanging the scrapers. The coupling pins are preferably arranged on the scraper webs engaging like bridges over the scraper-chain assembly. They may be designed, for example, as strong cylindrical pins, the plug-in holes on the central webs of the horizontal chain links being preferably designed as round holes. The coupling pins can project with their free pin ends downwards out of the push-in openings of the horizontal chain links, the scraper connection being able to be secured by locking elements arranged or engaging on the free pin ends. Hence, an arrangement is also possible in which the scraper connection is made on the horizontal chain links of the scraper-chain assembly without the use of screwed parts.

The invention will be explained in more detail below in conjunction with exemplary embodiments shown in the drawings.

BRIEF DESCRIPTION OF THE DRAWINGS

FIG. 1 shows a short longitudinal section of a link chain according to the invention in a top view, the vertical chain links being shown in horizontal longitudinal section;

FIG. 2 shows the link chain according to FIG. 1 in a side view, the horizontal chain links being shown in longitudinal section;

FIG. 3 shows a two-strand scraper-chain assembly, comprising two parallel link chains according to the invention for double central chain scraper conveyors having a connection of the scrapers to the horizontal chain links, which are shown here in cross-section;

FIG. 4 shows the arrangement according to FIG. 3 in a view from the underside of the scraper;

FIG. 5 shows the scraper connection according to FIGS. 3 and 4 in a top view in order to explain the operation when connecting a scraper to the two horizontal chain links of a two-strand scraper chain;

DETAILED DESCRIPTION OF THE EMBODIMENTS

Figure 6:
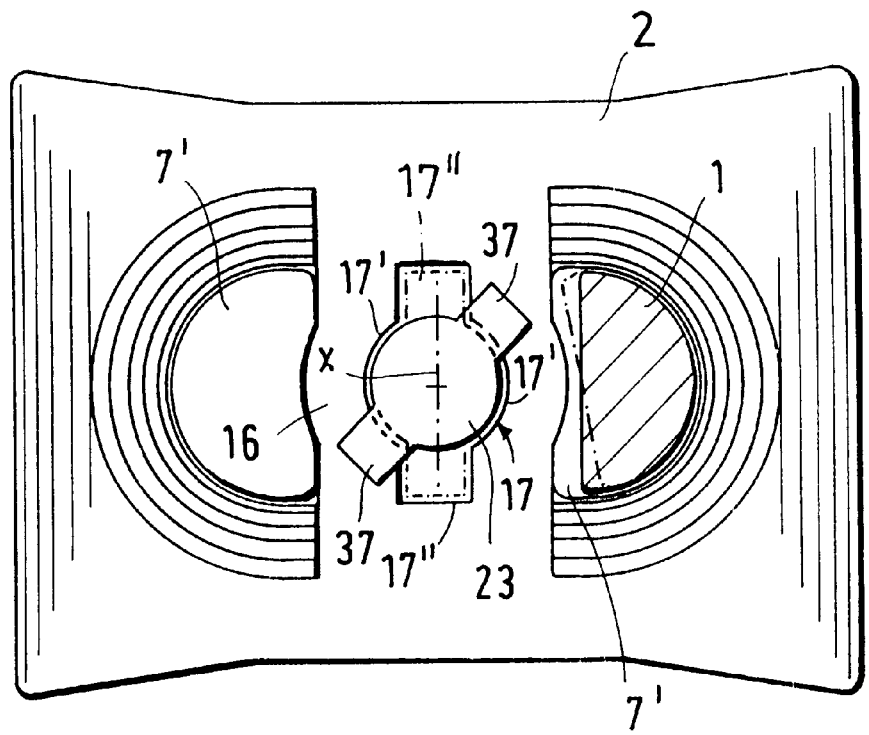
FIG. 6 shows, in top view an individual horizontal chain link for use in a scraper-chain assembly according to the invention.

The link chain illustrated in FIGS. 1 and 2 for chain conveyors, in particular for face conveyors in the form of scraper-chain conveyors, comprises, as usual, eye-like chain links 1 and 2 that are hooked into one another in an articulated manner, stand at right angles to one another and are movable in an articulated manner, namely the upright or vertical chain links 1 and the lying or horizontal chain links 2 hooked into these. The vertical and horizontal chain links 1 and 2 are of different construction in terms of their shaping and in their dimensions. The horizontal chain links 2 comprise one-piece forgings, whereas the vertical chain links 1, as is usual in the case of round-link chains, comprise profiled wires shaped like eyes which, after being hooked into the horizontal chain links 2, have their ends joined by butt welding to form the closed chain links.

The vertical chain links 1 have all around a constant wire cross-section, namely a flattened, approximately semicircular cross-section running around on its external contour, as the sectional illustration of FIGS. 1 and 2 shows. They comprise the two parallel longitudinal limbs 3, which are integrally connected at one side via arcuate nose parts 4, and whose oval internal openings are designated by 5. The vertical chain links 1 are accordingly constructed in the manner of the chain eyes which are usual in the case of round-link chains, but have, running around over the longitudinal limbs 3 and their nose parts 4, an approximately semicircular cross-section, whose flattened external surface is designated by 6. A1 designates the length, B1 the width (height), T1 the pitch and C1 the clear internal width of the oval internal opening 5 of the vertical chain links 1.

The horizontal chain links 2 are shaped to be approximately plate-shaped and likewise have an oval internal opening 7, the length of which determines the pitch dimension T2 of these chain links, the clear internal width of the internal opening 7 being designated by C2. The two mutually parallel longitudinal limbs 8 of the horizontal chain links 2 are integrally connected at their two ends via nose parts 9, of which the outer boundary, seen in the top view according to FIG. 1, is formed by a boundary surface 10 running at right angles to the chain axis, as is known per se. The length of the horizontal chain links 2, which are symmetrical in relation to their longitudinal and transverse axis, is designated by A2, and the maximum width of these chain links, which corresponds to the length of the boundary surfaces 10 of the nose parts 9, is designated by B2. The pitch dimension T2 of the horizontal chain links 2 is preferably, for example, at least about 10% greater than the pitch dimension T1 of the vertical chain links 1. The clear internal width C2 of the horizontal chain links 2 is considerably greater than the clear internal width C1 of the vertical chain links 1, C2 preferably being about 30–50% greater than C1, in order that the vertical chain links 1 can be hooked into the internal openings 7 of the horizontal chain links 2. The clear internal width C2 of the horizontal chain links 2 in this case needs to be greater only by the required articulation play than the dimension L of the flattening 6 of the vertical chain links 1. The length A2 of the horizontal chain links 2 is considerably greater than the length A1 of the vertical chain links, preferably by 40–60%. The horizontal chain links have over their entire length a greater external width than the vertical chain links 1, the width dimension B2 preferably being about 40–60% greater than the width dimension B1 of the vertical chain links 1.

The horizontal chain links 2 have the greatest width dimension B2 at their two end, nose parts 9, since they are provided with lateral reduced sections 11 at their side boundaries forming the longitudinal limbs 8. At their nose parts 9, the horizontal chain links 2 have, in their chain link longitudinal central axis, a round cross-section with a diameter D that is smaller than the external width L of the flattenings 6 of the vertical chain links 1 and the clear internal width C2 of their internal opening 7. From this circular cross-section with the diameter D, located in the chain axis, the cross-section of the nose parts 9 increases towards the lateral external boundaries of the chain links 2, the greatest cross-sections being present in the four corner regions of the chain links 2, which are approximately rectangular in top view, that is to say in the four transition regions between the nose parts 9 and the longitudinal limbs 8. The nose parts 9 of the horizontal chain links 2 have, at their end surfaces given by the external boundaries 10, a convex arcuate chainwheel bearing surface 12. The arcuate surface surrounding its oval internal opening 7 is also shaped so as to be convex arcuate all around in cross-section, as is shown in the drawing at 13. In addition, the horizontal chain links 2 have over their entire length a constant thickness that corresponds to the diameter D of the circular cross-section of their nose parts 9 in the chain link longitudinal axis, the cross-sectional size of the parallel longitudinal limbs 8 in the intermediate region between the nose parts 9 corresponding to the cross-sectional size of the nose parts in the circular central region having the diameter D, or being at most about 10% larger than this.

Indicated in FIG. 1 is a chainwheel 14 serving for the drive and the deflection of the link chain or scraper chain and having chainwheel teeth 15 slotted in the diameter direction for the engagement of the vertical chain links 1, against which teeth the horizontal chain links 2 rest over a large area with their approximately semicircularly convexly shaped bearing surfaces 12 when running around the chainwheel. Since the horizontal chain links 2 have, at their nose parts 9, an external width B2 that it at least 30–60%, preferably about 50%, greater than the external width or height B1 of the vertical chain links 1, the result when running around the chainwheel is comparatively large bearing surfaces between the surfaces 12 of the chain links 2 and the flanks of the chainwheel teeth 15, which are preferably of hollowed-out design to match the approximately semicircular contour of the bearing surfaces 12, with the result that the pressures per unit area between the bearing surfaces 12 and the mating surfaces on the chainwheel are kept within limits even at high drive powers.

The link chain described is preferably intended for use in scraper-chain conveyors of very high delivery lengths and correspondingly high drive powers, in particular in face conveyors having lengths of 400–500 m. In the event of using standard round-link chains, it would be necessary here to provide chain links having a wire diameter of about 42–50 mm. In order to be able to use the link chain according to the invention in the case of such high-power scraper-chain conveyors, the loadbearing cross-section of the vertical and horizontal chain links 1 and 2 of the link chain described must be dimensioned such that they correspond to the usual round-link chains having a wire diameter of 42–50 mm, preferably 46–48 mm. In this case, in order to be able to use the link chain according to the invention in the case of the scraper-chain conveyors which are present and usual in mining, the external width (height) B1 of the vertical chain links 1 is dimensioned such that it is not greater than 122–125 mm. In this case, in order to achieve the high required chain forces, the semicircularly profiled vertical chain links 1 have, running around on their flattening 6, a width dimension L of at least about 65–68 mm and a height dimension H of at least about 34–38 mm, so that its wire cross-section approximately corresponds to the cross-section of a round wire of 50 mm. The flattenings 6 on the longitudinal limbs 3 of the vertical chain links 1 form relatively large sliding surfaces in the delivery and return run of the scraper-chain conveyor, in order to support the vertical chain links on the bottom plates of the conveyor channel.

In the abovementioned case of using the scraper chain according to the invention for high-power conveyors of long conveyor lengths, the horizontal, forged chain links 2 may have a diameter D of, for example, 46 mm in the nose central plane, with the result that here the cross-sectional size is somewhat smaller than that of the vertical chain links 1, whose internal openings 5 may have here a clear internal width C1 of, for example, about 50 mm. This dimensioning of the diameter D is made possible by the horizontal chain links 2 being provided with the lateral thrust broadenings along the boundary surfaces 10. These lateral broadenings, having bearing surfaces 12 of large dimensions running transversely to the chain axis, lead to a favourable introduction of tensile force into the chain links 2, which, as can be seen, is more beneficial the wider the nose parts 9 are designed, that is to say the larger the dimension B2 is selected. The bearing surface 12, which is shaped to be convex and semicircular to the outside, merges into flat surfaces on the horizontal chain links 2 to the right and left of its vertical longitudinal central plane, at the side surfaces formed by the reduced sections 11. The longitudinal limbs 8 of the horizontal chain links 2 are accordingly bounded on their external sides by vertical, flat surfaces and on the inner side, bounding the internal opening 7, by convex semicircular side surfaces. The cross-sectional size of the longitudinal limbs 8 is preferably dimensioned to be equal to or somewhat larger than the cross-section of the nose parts 9 in their central plane having the circular diameter D.

The link chain described above has a comparatively small overall height at a high required tensile force, and is also distinguished by a beneficial running and loading behaviour in use. This is true in particular also in relation to its expansion behaviour in conveyor operation. It is also advantageous from this point of view that the horizontal chain links 2, prepared as forgings, have a length and width which are distinctly greater than the length dimension and width dimension on the vertical chain links 1 which, as mentioned, are produced from approximately semicircularly profiled rolled profile wires in a welded design.

In the event of using the above-described link chain for scraper-chain conveyors, the scrapers transporting the material to be conveyed in the conveyor channel as drivers are arranged on the horizontal chain links 2 which, on account of their shaping and dimensions, are primarily particularly suitable for the detachable scraper connection. For the detachable scraper connection to the horizontal chain links 2, it is possible to provide the scraper connections which are known in numerous configurations, most of which are designed using screw connections. Particularly advantageous configurations of the scrapers and their connections to the horizontal chain links, which also manage without screw connections, are illustrated in FIGS. 3 to 7.

In the case of the embodiment according to FIGS. 3 to 5, the two-strand scraper-chain assembly for the double central chain scraper conveyor comprises two mutually parallel, identical link chains generally shown in FIGS. 1 and 2. In this case, however, the horizontal chain links 2 of the two link chains are of a modified construction with respect to the horizontal chain links 2 according to FIGS. 1 and 2. Differing from the design according to FIGS. 1 and 2, either all the horizontal chain links 2 of the scraper-chain assembly or else only those horizontal chain links 2 which serve for the scraper connection are constructed in the manner of webbed chain links which have a central web 16 that extends transversely across the centre of their internal opening 7, is integrally connected to the parallel longitudinal limbs 8 and subdivides the oval internal opening 7 into two hanging openings 7' for the adjacent vertical chain links 1, the central web 16 having at its centre a push-in opening 17, passing through it vertically, which is designed here as a round hole. If only the horizontal chain links 2 serving for the scraper connection are constructed in the manner of webbed chain links, then the remaining horizontal chain links 2, which do not serve for scraper connection, may be designed in the manner of the horizontal chain links 2 shown in FIGS. 1 and 2. The two scraper chains, circulating in parallel, spaced from each other in the central region of the conveyor channel in the conveyor direction according to arrow F, of the two-strand scraper-chain assembly have the scrapers 18 fitted to their horizontal chain links 2, which are constructed as webbed chain links. As is primarily shown by FIG. 3 in an exemplary embodiment, the scrapers 18 comprise scraper strips whose scraper wings 19, guided in the guide channels on the side profiles of the conveyor channel, are connected, preferably integrally, in the top region via a bridge-like scraper web 20. Underneath the scraper web 20, the scrapers 18 have, between their scraper wings 19, a pocket recess 21 that is open towards the scraper foot 22 and also to the scraper side, preferably also towards the driver side and also towards the rear side of the scraper, and this accommodates the two horizontal chain links 2, over a partial length to which the scraper 18 is detachably connected. The connection of the scraper is performed with the aid of coupling pins 23 which are arranged firmly, preferably integrally, on the scraper web 20 and extend downwards from the scraper web 20 into the pocket recess 21. In this case, the two coupling pins 23, arranged at the lateral spacing of the two scraper chains of the two-strand scraper-chain assembly, engage in the push-in openings 17 of the associated horizontal chain links 2, which results in the high-strength connection of the scrapers 18 to the two scraper chains being produced. In the exemplary embodiment shown, the coupling pins 23 are cylindrical and the push-in openings 17 are correspondingly constructed as round holes. It can be seen from FIG. 3 that, when the scrapers 18 are coupled, the two horizontal chain links 2 rest with their upper side against the underside of the scraper web 20.

Securing the scrapers 18 against lifting off from the horizontal chain links 2 in conveyor operation may be performed with the aid of different locking elements. In the case of the embodiment according to FIGS. 3 to 5, for this purpose use is made of locking elements in the shape of locking strips 32, which engage under the chain links 2 pushed onto the coupling pins 23. As is primarily shown by FIG. 3, each scraper 18 has, in the central region between its two coupling pins 23, a locking strip 32, which is connected firmly and preferably integrally to the scraper web 20 and, in the pocket recess 21 of the scraper 18, is directed towards its scraper foot 22 or to the bottom of the conveyor. In the view according to FIG. 3, the locking strip 32, formed from a wall element of the scraper 18, has an approximately T-shaped outline. The said locking strip 32 subdivides the pocket recess 21 located underneath the continuous scraper web 20 into two narrow receiving pockets arranged at a lateral distance from each other, each of which accommodates one of the two horizontal chain links 2 of the two-strand scraper-chain assembly. It can be seen from FIG. 3 that the two chain links 2, in each case pushed onto a cylindrical coupling pin 23 (the pins engaging the push-in openings 17), are supported at their mutually facing sides or longitudinal limbs 8 on the broader, lower locking limb of the T-shaped locking strip 32, whose mutually opposite strip parts form locking attachments 33 engaging under the chain links 2 at their adjacent longitudinal limbs 8. At their other, outer longitudinal limbs 8, the two horizontal chain links 2 are supported on corresponding attachments 34 of the scraper 18, which are expediently likewise connected firmly and integrally to the scraper 18. The two horizontal chain links 2 serving for the scraper connection are therefore in each case engaged underneath at their two longitudinal limbs 8, by which means the scraper connection is secured, that is to say the lifting of the scraper 18 off the horizontal chain links 2 of the scraper-chain assembly in conveyor operation is prevented, and hence the pin connection is secured. FIG. 3 also shows that the coupling pins 23 do not necessarily need to project downwards out of the push-in openings 17 in order to secure the scraper connection. As is also shown by FIG. 4, the interspace between the two horizontal chain links 2 pushed onto the coupling pins 23, and also partially underneath these chain links, is closed by the locking strip 32, which is fixedly arranged on the scraper 18 and is formed by a vertical web wall or the like, underneath the scraper web 20, with the result that the wall surface of the scraper forming the locking strip 32 can form a debris driving surface of the scraper in its central region. In FIGS. 3 to 5, 35 designates the upwardly directed, narrower limb of the locking strip 32, which limb is located between the two chain links 2 pushed onto the coupling pins 23 and is fixedly connected to the scraper web 20.

The procedure during the detachable connection of the individual scrapers 18 to the associated horizontal chain links 2 of the two-strand scraper-chain assembly is shown schematically in FIG. 5. With the scraper chains relieved of load and loosened, the two horizontal chain links 2 serving for this scraper connection are brought into the mutual oblique or angular position shown here, in which they can be pushed from below onto the coupling pins 23, with their push-in openings 17 engaging the pins. This is not hampered by the locking strip 32 fixedly arranged on the scraper—18, since the protruding narrower limb 35 of the locking strip 32 are accomodated in lateral recesses 36, which are located in the centre of the longitudinal limbs 8 of the chain links 2, with the result that in this oblique position the chain links 2 can be pushed unimpeded from below onto the coupling pins 23. This is possible because the locking strip 32 is arranged offset towards the rear side of the scraper in relation to its centre line connecting the two pins 23, and at the same time the distance between the mutually facing free ends of the parts 34 and 35 is somewhat greater than the width of the horizontal chain links 2 in the central region between their two lateral recesses 36. In the oblique position accordingly to FIG. 5, the narrower protruding limbs 35 of the locking strip 32 are accomodated in the lateral recesses 36, while on the opposite side the locking attachments 34 formed by locking tabs are accomodated in the recesses 36 located here in the chain links 2, with the result that the chain links 2 can be placed on the scraper unimpeded by the locking attachments or locking tabs, and can be pushed onto the coupling pins 23. If the horizontal chain links 2 are subsequently pivoted into their normal parallel position according to FIG. 4, to be specific about the vertical axes of the coupling pins 23, then the result is the locking position shown in FIGS. 3 and 4, in which the horizontal chain links 2 are engaged underneath by the locking attachments 33 on the wider locking limb and the locking tabs 34 of the scraper, and thus the scraper connection is secured. In conveyor operation, the scraper-chain assembly is tensioned, as is usual, with the result that the horizontal chain links 2 serving for the scraper connection remain in their parallel position in relation to one another according to FIG. 4, and thus the scraper connection continues to be provided. The detachment of the scrapers 18 from the horizontal chain links of the scraper-chain assembly is performed analogously in the converse manner to the scraper connection described in conjunction with FIG. 5. The lateral recesses 36 of the horizontal chain links 2 serve here as a mounting aid for the production of the scraper connection and for the detachment of the scrapers from the scraper-chain assembly. It can be seen that, in the case of the scraper connection according to FIGS. 3 to 5, it is not necessary, for securing the scrapers to the scraper-chain assembly, to use any loose parts which secure the pin engagement after the horizontal chain links 2 have been pushed onto the coupling pins 23.

Figure 7:
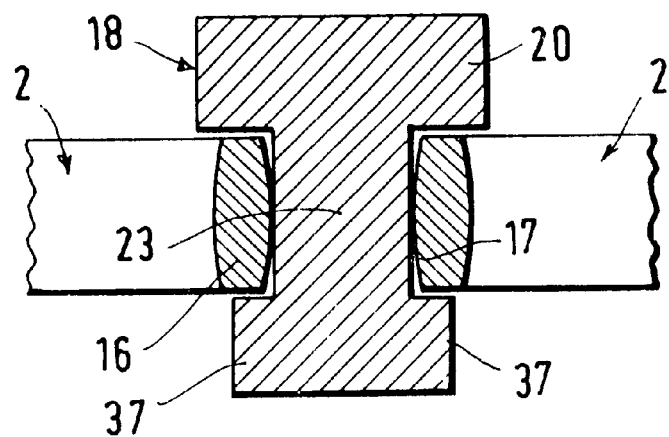
FIG. 7 shows the chain link of FIG. 6 in a vertical section in combination with a horizontal chain link.

The same is true of the embodiment of the scraper-chain assembly shown in FIGS. 6 and 7. From the one-strand or two-strand scraper-chain assembly, which corresponds to that of the previously described scraper-chain assemblies, only a single horizontal chain link 2 is shown here, and in FIG. 6 a single vertical chain link 1, which is hooked into one of the two hook-in openings 7' of the horizontal chain link 2. The securing of the scrapers 18 connected to the scraper-chain assembly or its horizontal chain links 2 with the aid of the coupling pins 23 is performed here by means of a rotational locking means. In this case, the coupling pins 23 have, at their free pin ends projecting downwards out of the push-in openings 17 of the central webs 16 of the horizontal chain links 2, broadenings which form locking cams 37 which, in the exemplary embodiment shown, are arranged on the diametrically opposite sides of the coupling pin 23, which is cylindrically shaped in the region in which it reaches through the push-in opening 17, and grip under the central web 16 of the associated horizontal chain link 2, as a result of which the pin engagement in the push-in openings 17 of the chain links 2, and consequently the scraper connection to the horizontal chain links 2, is ensured. In order to be able to insert the coupling pins 23 provided with the locking cams 37 into the push-in openings 17, the push-in openings 17, as can be seen from FIG. 6, are designed rather like a keyhole, in such a way that its opening cross-section corresponds approximately to the cross-section of the coupling pins 23 at their free lower ends where the locking cams 37 are located. Accordingly, the push-in openings 17 on the horizontal chain links 2 have a central round cross-section 17' which is matched to the cylindrical shape of the coupling pin 23 and has, on the two opposite sides, in each case a broadening 17", approximately rectangular here, which is matched to the shape of the locking cams 37. The centre of the push-in openings 17 lies in the centre of the central web 16 and consequently in the centre of the chain link 2, whereas the longitudinal axis X of the push-in holes 17, constructed as elongated holes, runs in the central axis of the central web 16, that is to say in the transverse direction of the chain link 2. It can be seen that the horizontal chain link 2 can be pushed onto the coupling pin 23 in a rotational position in which its keyhole-like broadenings 17" coincide with the locking cams 37. After the horizontal chain link 2 has been pushed onto the coupling pin 23, the chain link 2 is rotated into the normal connection position, for example by 30–50° with respect to the coupling pin 23, so that the two locking cams 37 now grip under the central web 16 and hence secure the scraper connection. In the case of this advantageous embodiment of the scraper locking means, too, no connectable loose parts are used for securing the scraper connection, with the result that the connection of the scraper and also the exchange of the scraper may be carried out very simply and rapidly.

It goes without saying that the rotational locking means described above in conjunction with FIGS. 6 and 7 and serving to secure the scraper connection can be provided both in the case of a single-strand and in the case of a two-strand scraper-chain assembly, and in the number of locking cams 37 arranged on each coupling pin 23, and hence also the shaping of the push-in openings 17, may be different. For example, each coupling pin 23 may have on its lower free end four locking cams 37 in a cross-shaped arrangement, the push-in openings 17 being correspondingly provided with cross-shaped push-through openings for the coupling pins.

It goes without saying that the invention is not restricted to the above-described exemplary embodiments, and in particular the scrapers and/or the scraper securing can also be designed differently from the exemplary embodiments shown. Instead of the locking strips 32 arranged detachably or non-detachably on the scrapers 18, it is also possible to use other locking elements for the securing of the scraper connections, for example locking or stop elements that can be pushed onto the free ends of the coupling pins 23 and which prevent the coupling pins 23 lifting out of the push-in openings 17 of the horizontal chain links 2. In this case, closable stop or clamping rings or securing pins or the like can also be used at the free ends of the coupling pins 23, the said rings or pins being able to be pushed into recesses or transverse holes in the coupling pins 23. It is also possible to provide, at the free lower ends of the coupling pins 23, cam or stop elements mounted in a sprung manner in recesses, grooves or the like, which when the horizontal chain links are pushed onto the coupling pins are pressed back elastically into the cross-section of the coupling pins and are then pushed radially outwardly under the horizontal chain links by spring action when the latter have been pushed completely onto the coupling pins. Instead of the connection of the scraper with the aid of the coupling pins described, in the case of the single-strand or two-strand scraper-chain assembly according to the invention, it is also possible for different scraper connections, even those of a type known per se, to be provided, although the connection with the aid of the coupling pins reaching through the horizontal chain links obviously offers specific advantages, since thereby a scraper connection that is simple to handle is possible with a comparatively simple configuration of the scrapers, in particular also a scraper connection without screw connections. The embodiment of the scraper connection according to FIGS. 3 to 5 may be modified to the effect that here the locking strip 32 is used as a loose locking element which may be pushed on in order to secure the scraper connection in the shown locking position on the scraper 18 or on the horizontal chain links 2 connected to the scraper via the coupling pins 23. The securing of the scraper according to FIGS. 3 to 5 can also be applied in a similar form in the case of a single-strand scraper-chain assembly having only a single, round-link chain of the type described bearing the scrapers.

As has been mentioned, in the case of the link chain according to the invention, the vertical chain links 1 have a flattened cross-section which is at least approximately semi-circular. This states that the ratio of the width dimension L to the height dimension H of the flattened cross-section is expediently equal to or less than 2. Depending on the required chain strength, the height dimension H of the flattened cross-section may deviate upwards or downwards by up to about 25% from half the width dimension L.

We claim:

1. A link chain for chain conveyors, comprising a plurality of vertical chain links and a plurality of horizontal chain links, said vertical and horizontal chain links being linked alternately to one another in an articulated manner;

said vertical chain links defining a generally oval internal opening, and having a constant, uniform substantially semi-circular cross-section shaped to provide a flattening on the outwardly facing surface;

said horizontal chain links defining a generally oval internal opening, having a width greater than the width of said internal opening of said vertical chain links; and said horizontal chain links having at each end, nose parts with an external width greater than the external width of said vertical chain links and, at a central longitudinal axis of said chain links, said nose parts having a round cross-section with a diameter that is smaller than the external width of said flattened surface of said vertical chain links and smaller than said width of said internal opening of said vertical chain links, the nose parts of said horizontal chain links having an external boundary formed by a surface running at right angles to the axis of said chain.

2. A link chain according to claim 1 wherein said horizontal chain links have their greatest width at their two end nose parts and are provided with lateral reduced sections at their side boundaries forming the longitudinal limbs.

3. A link chain according to claim 1 wherein said horizontal chain links have over their entire length a greater external width than said vertical chain links.

4. A link chain according to claim 1, wherein the pitch and the length of said horizontal chain links are respectively greater than the pitch and the length of said vertical chain links.

5. A link chain according to claim 1 wherein external surfaces of said nose parts of said horizontal chain links are constructed as convex arcuate chain wheel bearing surfaces.

6. A link chain according to claim 1 wherein inwardly facing surfaces of said horizontal chain links, facing said internal opening, are shaped to be convex and arcuate in cross-section.

7. A link chain according to claim 1, wherein said vertical chain links comprise welded profiled wires, and said horizontal chain links comprise one-piece forgings.

8. A link chain according to claim 1, wherein the ratio of the width dimension to the height dimension of said flattened cross-section of said vertical chain links is no greater than 2.

9. A link chain according to claim 1, wherein loadbearing cross-sections of said vertical and horizontal chain links correspond in area at least to those of a standard round-link chain with a wire diameter of 42–50 mm.

10. A link chain according to claim 1, wherein the height or external width of said vertical chain links, and hence the height dimension of the chain, is not greater than 122–125 mm.

11. A link chain according to claim 1, wherein said horizontal chain links have over their entire length a constant thickness that corresponds to the diameter of the circular cross-section of said links in said longitudinal central plane of said nose parts, the cross-sectional size of parallel longitudinal limbs joining said nose parts being at most about 10% greater than the cross-sectional size of said circular nose parts in said central plane.

12. A link chain according to claim 11, wherein said cross-sectional size of said limbs corresponds to said cross-sectional size of said nose parts.

13. A link chain according to claim 1, wherein said horizontal chain links have, at least at their nose parts, an external width that is at least 30–60% greater than the height or external width of said vertical chain links.

14. A chain link according to claim 13, wherein said external width of said horizontal chain links is at least 50–60% greater than that of said vertical chain links.

15. A link chain according to claim 1, wherein said vertical chain links have, on said external flattening, a thickness that is greater than the thickness dimension of said horizontal chain links.

16. A link chain according to claim 15, wherein said thickness of said flattening of said vertical chain link is about 10–30% greater than that of said horizontal chain links.

17. A scraper chain assembly, comprising one or more link chains according to claim 1, and scrapers mounted on at least some of said horizontal chain links or each link chain.

18. An assembly according to claim 17, wherein said scrapers are an integral component of said horizontal chain links of said link chain(s).

19. An assembly according to claim 17, wherein said scrapers have coupling pins and said horizontal chain links on which said scrapers are mounted are constructed as webbed chain links having fixed central webs extending transversely across said link, said webs having openings for receiving said coupling pins on said scrapers.

20. An assembly according to claim 19, wherein said scraper comprises a bridge-like scraper web on which said coupling pins are carried, and a foot which extends below the respective said horizontal chain link, and said scraper defines a pocket recess in a central region below said scraper web for accommodating a respective said horizontal link, said recess opening towards said scraper foot and/or towards a driver side and a rear side of said scraper.

21. An assembly according to claim 19, wherein said coupling pins project with their free pin ends downwards out of said openings in said webs of said horizontal chain links, said scraper being secured by locking elements arranged at said free pin ends of said coupling pins.

22. An assembly according to claim 19, wherein said scrapers are secured to said horizontal chain links by locking elements which engage under said horizontal chain links when they are pushed onto said coupling pins.

23. An assembly according to claim 22 wherein said locking elements are formed integrally with said scraper.

24. An assembly according to claim 22, wherein said scrapers are secured to said horizontal chain links by a rotational locking means, said coupling pins having at their free ends locking elements in the form of locking cams which can be guided, by a relative rotational movement between said scraper and said horizontal chain link about the pin axis, into a locking position in which said locking cams engage under said horizontal chain links, said openings of said horizontal chain links being designed as non-round openings to match the shape of said coupling pins and their said locking cams.

25. An assembly according to claim 24, wherein said coupling pins of said scrapers each have, at their free ends engaging under said horizontal chain links, at least two fixed locking ca'ms, which are offset in relation to one another in the circumferential direction of said coupling pins and are directed transversely relative to the pin axis.

26. An assembly according to claim 19, comprising two said link chains to provide a two-strand scraper-chain assembly for double central chain scraper conveyors, wherein said scrapers each have two said coupling pins that are fixedly arranged in parallel at a lateral spacing and engaging respective openings of two horizontal chain links, of said two link chains, arranged beside each other at a lateral spacing, each said pin being secured in engagement with said respective opening by means of a locking element.

27. An assembly according to claim 26, further comprising, for said two coupling pins of said scraper, a common locking element in the form of a locking strip that has a locking limb, which protrudes into and spans the space between said two parallel horizontal chain links and is provided with locking attachments engaging under said two horizontal chain links.

28. An assembly according to claim 27, wherein said two horizontal chain links each have, centrally on their mutually facing sides, a recess which can be aligned with the ends of said locking strip by rotating said horizontal chain links.

29. An assembly according to claim 27, wherein said locking strip is arranged in a fixed manner on said scraper between said two horizontal chain links and has locking lugs or locking attachments engaging under said horizontal chain links, and said scraper is provided, on the side opposite said fixed locking strip, with a locking attachment engaging under outer longitudinal limbs of said horizontal chain link.

* * * * *